Dec. 2, 1969 R. J. FARRALL ET AL 3,481,657

METHOD AND DEVICE FOR STORAGE OF VISUAL INFORMATION

Filed Aug. 10, 1967

INVENTORS,
RICHARD J. FARRALL
ROBERT D. RUTLEDGE

BY Jacobi & Davidson
ATTORNEYS

United States Patent Office 3,481,657

Patented Dec. 2, 1969

3,481,657

METHOD AND DEVICE FOR STORAGE OF VISUAL INFORMATION

Richard J. Farrall, 1814 Mount Pleasant Drive, McLean, Va. 22101, and Robert D. Rutledge, 1111 Arlington Blvd., Arlington, Va. 22209

Filed Aug. 10, 1967, Ser. No. 659,739
Int. Cl. B42f *17/16*
U.S. Cl. 312—234.2 7 Claims

ABSTRACT OF THE DISCLOSURE

A method and device for storing visual information, such as photographic slides or the like in cubic form. A plurality of elongated information media strips are formed as, for example, by aligning a series of photographic slides in end-to-end relationship along a flat carrier. These information strips are then disposed in parallel relationship in a housing having a series of vertically and horizontally aligned compartment means. Any particular compartment carrying a particular information strip therein can be determined by prescribed orthogonal axes nominally referred to as X and Y axes. The extent of the particular information strip can be considered as extending along a Z axis which is mutually perpendicular to the X and Y axes. As a result, any particular piece of information has a prescribed X, Y and Z coordinate location, and by ascribing an access number to each individual information medium, rapid retrieval is possible.

This invention relates to information storage and more particularly it relates to a method and device for storing visual information in a manner which permits rapid retrieval of any selected item of visual information.

In particular, the present invention is addressed to a system which can be used in connection with the storage and retrieval of pictorial information, such as photographic slides, photographs, prints or other such items. However, the broad principles of the present invention could be used with virtually any type of documentation where controlled storage and retrieval is a requirement.

In the past, a variety of different methods have been developed for the storage of information media, but none of these methods has proved to be entirely satisfactory in use. For example, the use of file drawers, file indexes and so on is well known for the storage of documentation. However, there are several drawbacks to such known arrangements, as, for example, the fact that such arrangements usually require an undue amount of space, do not provide for ready expansion and do not provide for adequate protection of the particular items being stored. Additionally, with such known storage systems, it is a difficult and cumbersome job to locate and retrieve any particular item of information, e.g. one particular document.

As an illustrative example of the need for the present invention and the shortcomings of the prior art, it will be recognized that certain facilities such as magazines, photographic laboratories, commercial photographers and so on, have the need for storing great numbers of photographic slides. It is often required that these slides be kept in storage for several years and such a facility thus necessarily has an accumulation of several thousand or even several hundred thousand of such slides which must be properly stored and indexed. Naturally, any storage arrangement, regardless of the nature of the same, must adequately protect the photographic slides from abrasion, scratching, dust and so on. Yet, when the need arises to retrieve one particular photographic slide from the vast storage collection thereof, some means must be provided for enabling ready access and retrieval of such a slide. Known storage arrangements for such photographic slides, such as keeping the same in file index drawers or boxes or on file sheets, has not proved to be entirely satisfactory since such storage arrangements take up undue amounts of space and require vast storage areas. Additionally, using such known systems, if it is desired to locate one particular slide for retrieval, it is often necessary to check through various files, records and indexes to find in which particular box or book the slide has been assigned. Then, a physical search must be done to locate the particular box or book in the storage area, and thereafter, one must manually search through the box or book to find the desired slide.

In an endeavor to overcome certain of the aforementioned problems, it has been suggested that electromechanical storage devices, such as storage drums or the like, could be used. However, it has been found that storage devices of this type are inordinately expensive, are subject to mechanical failures, require maintenance from time to time, and, in general, require a higher cost per unit of storage than does a manual system.

With the foregoing in mind, it is, therefore, an object of the present invention to overcome the difficulties and deficiencies associated with prior art forms of storage systems and to provide in their stead, a new and improved information storage system.

Another object of the present invention is to provide a method and device for storing visual information in a cube-type storage system of the type having three mutually perpendicular coordinates so that by ascribing a proper accession number to each piece of information, retrieval can be readily accomplished.

Another object of the present invention is to provide a visual information storage method and device utilizing the principles of mutually perpendicular orthogonal axes for location of the items of information being stored.

Another object of the present invention is to provide a visual information storage method and device which is compatible with a variety of off lines indexing techniques including computer indexing.

Another object of the present invention is to provide a visual information storage system which requires an absolute minimum of space, yet which provides for rapid and efficient retrieval of any selected item of information stored therein.

Further objects of the present invention include the provision of a visual information storage method and device wherein (a) the stored information is protected from the deleterious effects of abrasion, dust and scratching; (b) whole strips of information can be readily retrieved and a particular item of information in the strip can be examined without removal from the strip; (c) no mechanical or electrical mechanism is utilized and thus maintenance problems are substantially eliminated; (d) whole storage units containing a multiplicity of stored information items can be readily handled and transported; and, (e) the unit cost for information storage is greatly reduced.

Other objects, advantages and salient features of the present invention will become apparent from the following detailed description, which, taken in conjunction with the annexed drawings, discloses a preferred embodiment thereof.

Referring to the drawings.

Figures 1, 2, 3, 4:
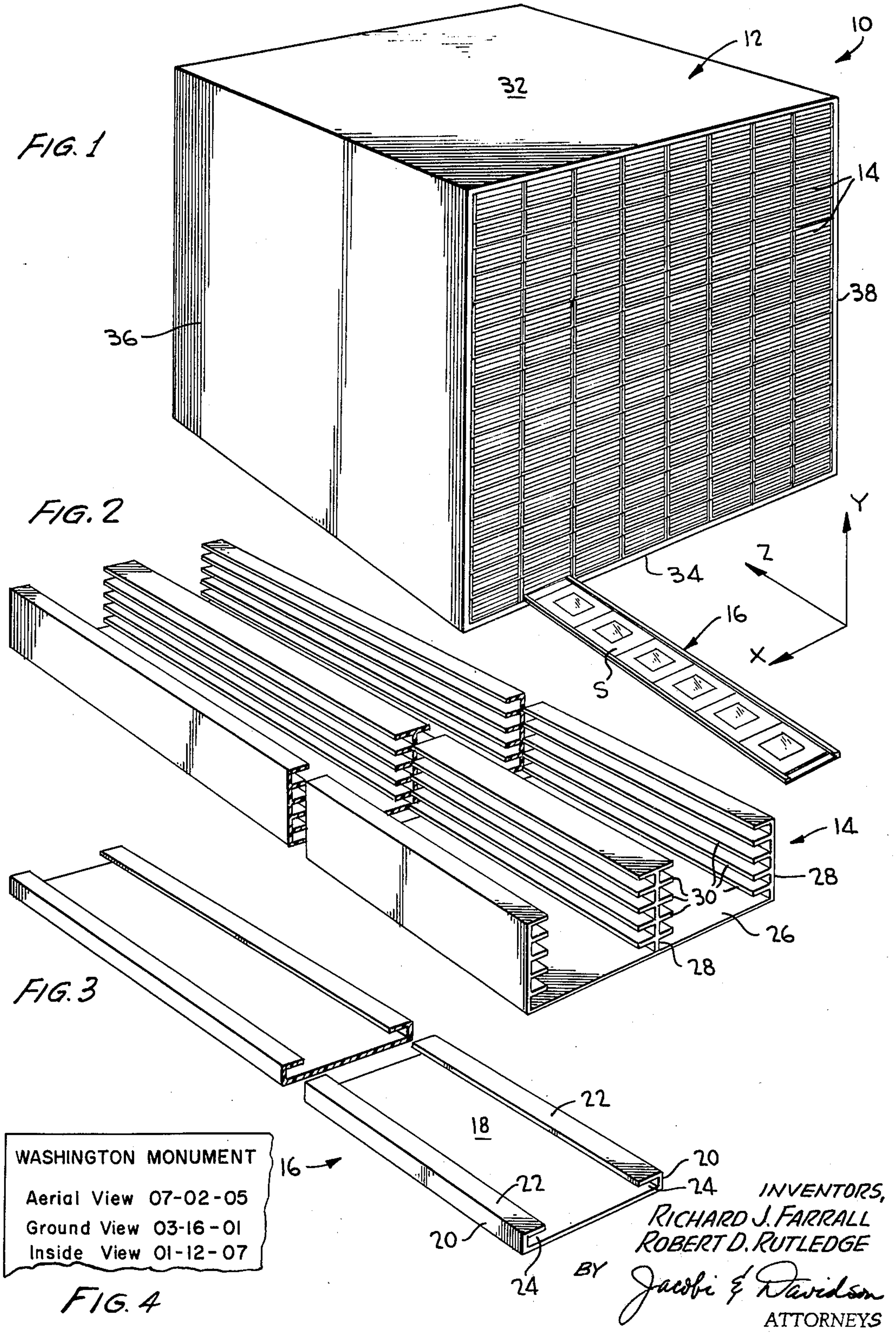
FIGURE 1 is a perspective view of a cube storage device in accordance with the principles of the present invention and which can be used in carrying out the method aspects of the present invention.
FIGURE 2 is a perspective view of the compartment means portion of the cube storage device of FIGURE 1.
FIGURE 3 is a perspective view of a single carrier means portion as used in the cube storage device of FIGURE 1.
FIG. 4 is a fragmentary plan view of an index card or other storage medium used in conjunction with the cube storage device of the present invention.

In general, the foregoing objects can be attained by the provision of a cube-shaped housing means having a series of elongated compartments extending in aligned horizontal and vertical rows. Each compartment means is capable of holding at least one carirer means, and the carrier means itself is capable of holding a plurality of individual pictorial information items aligned in a row. When the carrier means are inserted into the compartment means of the device, any given carrier means will have a particular horizontal and vertical location within the device so that the particular carrier means can be located by a suitable X and Y coordinate system where X is the horizontal coordinate and Y is the vertical coordinate or vice versa. Once the particular carrier means is located, the information along this carrier means is arranged in a depth or Z coordinate so that any particular item of information on the carrier means can also be enumerated. In other words, each different item stored in the cube storage device has its own particular X, Y and Z coordinates and through the use of proper accession numbers or indicia, these coordinates can be utilized to identify the information item for retrieval.

As an example, if it is assumed that the particular items of information to be stored are photographic slides or color transparencies, measuring 2 inches by 2 inches (2" x 2"), a 25 inch cube will store 18,000 such transparencies. In such a cube, 12 vertical rows and 25 horizontal rows can be provided with intermediate partition means creating 300 separate compartments. Each compartment in turn can hold five separate carrier means with each carrier means itself carrying 12 individual transparencies. As should be obvious, these 25 inch cubes can be readily transported and handled and can be easily stacked one upon the other against a wall. Even in a small room, it would be possible to arrange five such cubes horizontally along a wall and to provide four vertical rows of such cubes. Thus, there would be twenty such cubes which would ordinarily extend only two feet away from the wall in a room, but through the utilization of such cubes, 360,000 color transparencies can be readily stored.

With continued reference now to the drawings, there is shown in FIGURE 1 a device generally designated 10 which is capable of carrying out the objects set forth hereinabove. Such device 10 includes a housing means generally designated 12, a compartment means generally designated 14, as indicated in FIGURE 2, and a carrier means generally designated 16, as indicated in FIGURE 3.

Referring first to the carrier means 16 shown in FIGURE 3, it will be seen that such carrier means is an elongated flat tray which is preferably formed of extruded plastic. As such, the carrier means includes an elongated flat base portion 18, having a pair of opposed upstanding side walls 20 which carry a pair of inturned opposed side flanges 22. Between the flanges 22 and the marginal edges of the base portion 18, elongated channel means 24 are formed. The dimensions of the carrier means 16 can be varied and altered, as desired, in order to correspond to the particular type of information media being stored. In the case of a 2 inch by 2 inch (2" x 2") color transparency, the side walls 20 would be spaced apart by a distance very slightly in excess of 2 inches so that the edges of the color transparency could be disposed in the channel means 24. The length of the carrier means 16 can also be varied as desired to control the number of color transparencies or other information media which can be disposed in longitudinal succession along the base portion 18. If, for example, the carrier means 16 is 24 inches long, 12 such transparencies can be carried therealong as an information strip. It is preferred that the carrier means 16 is fabricated of some transparent plastic material so that all of the information carried therealong can be visually observed without necessarily removing the same from the carrier means.

Referring next to the compartment means, as shown in FIGURE 2, it can be seen that each compartment means 14 includes a base wall 26 and a pair of upstanding opposed side walls 28 arranged perpendicularly to the base 26. Each side wall carries a series of inturned flanges 30, spaced apart from one another by a distance at least equal to the thickness of the carrier means 16. These compartment means 14 are likewise formed preferably of extruded plastic and again, the dimensions thereof can be varied as desired, in accordance with the dimensions of the carrier means 16. Each compartment means can be formed as an individual unit, or alternatively, two or three or more of such carrier means can be connected together and formed as a unit.

Referring now to FIGURE 1, the casing or housing 12 is also preferably formed of plastic material and is of cube-shaped configuration having at least one open end. As such, the housing includes at least a top wall 32, a bottom wall 34 in spaced parallel relation thereto, and upstanding side walls 36 and 38 perpendicularly extending between and interconnecting the top and bottom walls. The compartment means 14 are then disposed within this housing 12 and the carrier means, with the information media carried thereon, are then disposed within the compartments themselves.

For simplicity of illustration, the cube illustrated in FIGURE 1 is substantially a 16 inch cube. Horizontally, or along the X axis, as shown in FIGURE 1, there are eight rows of compartments 14. Vertically, or along the Y axis of FIGURE 1, there are sixteen rows of compartments 14. Thus, as a total, there are 128 compartments 14 in the cube, and each of the compartments is capable of carrying five carrier means 16 on the inturned flanges 30 thereof. Thus, 640 individual carrier means 16 can be stored in the device of FIGURE 1. Since each carrier strip 16 can be sixteen inches deep, this means that eight 2 inch by 2 inch (2" x 2") photographic slides can be disposed in end-to-end relationship, or in a strip, along the carrier means 16. Thus, a total of 5120 individual 2 inch by 2 inch photographic slides could be carried on the sixteen inch cube shown in FIGURE 1. As previously indicated, if the size of the cube is increased to substantially a two foot cube, the number of 2 inch by 2 inch color transparencies which could be carried increases to 18,000. If the sizes increased to a three foot cube, the number of 2 inch by 2 inch color transparencies which can be carried is in excess of 50,000.

Having now described the basic structure of the present invention, and the manner in which the information media can be stored therein, attention must be directed to the manner in which any particular item of information within the storage cube can be readily retrieved. For this purpose, each individual information item is assigned a particular accession number or indicia which represents the coordinate location thereof. One suitable means for providing such accession indicia is through the use of a six digit number for each cube, the first two digits representing the horizontal or X coordinate, the next two digits representing the vertical or Y coordinate, and the last two digits representing the depth or Z coordinate. In the illustrated embodiment of FIGURE 1, let it be assumed that the X, Y and Z coordinates all commence at the lower right hand corner of the cube. One carrier means 16 is shown in partially extended position and one particular photographic slide, designated S is indicated along this carrier means. The accession indicia or number assigned to this particular slide S could be determined as set forth hereinafter.

The horizontal location of the extended carrier means 16 of FIGURE 1 is in the seventh row displaced from the lower right hand corner of the cube of FIGURE 1 Thus, the first two digits of the accession number would be "07". Vertically, or along the Y axis, there are sixteen compartments in the seventh horizontal row, with each compartment carrying five carrier means 16 therein. In other words, in the seventh horizontal row, there is a total of eighty stacked parallel carrier means 16. If it is assumed that the extended carrier means 16 of FIGURE 1 is the second one in the vertical stack, the Y coordinate of this extended slide would be "02." Finally, on the particular extended carrier means of FIGURE 1, there are eight photographic slides arranged in end-to-end relationship. The particular slide designated S is the fifth slide therealong so its Z coordinate would be designated as "05." Thus, the overall accession number for the slide S of FIGURE 1 would be "07–02–05." As a further example if it were assumed that the X, Y and Z coordinates commenced at the upper left hand corner of the cube of FIGURE 1, rather than the lower right hand corner thereof, then the accession number for the slide S would be "02–78–05."

The accession numbers can be stored on any suitable storage medium, such as index cards, lists, notebooks or the like, and such storage medium would also include the particular subject for each slide. Thus, assuming that the slide S of FIG. 1 depicted an aerial view of the Washington Monument, for example, the user would look in the storage medium under "W" to find the listing for the Washington Monument. In FIG. 4, a fragmentary portion of an index card is shown, and this card would be the card classified under the letter "W" for Washington Monument. After the user found this card by an alphabetical search, he would see that the aerial view was shown on the slide located at "07–02–05," i.e. on the slide S of FIG. 1.

Each individual cube 10 could itself be designated by a particular number which would preferably precede the accession numbers of the slides therein. For example, if thirty seven similar storage cubes had already been filled, and the storage cube 10 shown in FIGURE 1 was the thirty-eighth storage cube being filled, then this cube could itself be designated by the numeral 38. In such event, the overall accession number for the slide S would read "38–07–02–05."

In order to permit a more rapid vertical and horizontal optical scanning of the cube, the compartment may be made of two contrasting colors, which colors can be alternated both vertically and horizontally. It will naturally be understood that a cube storage device such as that described hereinbefore can be stored on any side, on its bottom or on end, so long as the person retrieving the particular slide knows from which position the X, Y and Z coordinates commence.

After reading the foregoing detailed description, it should be apparent that the objects set forth at the outset of the specification have been successfully achieved by the present invention.

Accordingly, what is claimed is:

1. A method of storing visual information media for ready retrieval thereof, said method comprising the steps of:

forming a plurality of substantially equally dimensioned elongated information strips by arranging groups of individual information media into longitudinal successions;

arranging said information strips in horizontally and vertically aligned rows with the strips being maintained in parallel relationship to one another to form a cubic storage form having said strips therein with each strip having a prescribed horizontal and vertical position and with each individual information medium having a prescribed depth position; and assigning to each individual information medium, an accession indicia representing the horizontal, vertical and depth position thereof within said cubic storage form;

a multiplicity of said individual information media thus being compactly stored in said cubic form in a manner whereby any individual medium can be readily located by means of its access indicia and can be retrieved by removing the strip carrying the same from said cubic storage form and locating said medium by its depth position along said strip.

2. A method as defined in claim 1 wherein said information strips are arranged along a transparent supporting medium which permits any individual item within said strip to be identified without removal from its supporting medium.

3. The method as defined in claim 1 wherein alternately contrasting colors are used vertically and horizontally to facilitate scanning for a particular information strip.

4. A cube type storage device for information media such as photographic slides or the like, said device comprising:

a housing;

a plurality of compartment means formed in said housing in perpendicularly aligned horizontal and vertical rows;

a flat elongated carrier means capable of carrying a plurality of individual information media arranged in a row therealong;

at least one such carrier means, with said information media thereon, disposed in each of said compartment means; and accession number means assigned to each individual information medium in said storage device;

said accession number means indicating the vertical and horizontal location of the compartment within which the carrier means carrying said individual information medium is located and further indicating the depth position of said individual information medium along said carrier means.

5. A cube type storage device as defined in claim 4 wherein said carrier means includes opposed side channel means for the reception of the edges of said information media.

6. A cube type storage device as defined in claim 5 wherein said compartment means includes at least a pair of inwardly directed opposed flanges which serve to support said carrier means.

7. A cube type storage device as defined in claim 4 wherein said carrier means is fabricated of a transparent material to permit visual observation of the information media carried thereon without removal of said media from said carrier means.

References Cited

UNITED STATES PATENTS

| | | | |
|---|---|---|---|
| 1,945,773 | 2/1934 | Dennerlein | 206—73 |
| 2,701,635 | 2/1955 | Mills | 206—73 |
| 2,774,472 | 12/1956 | Badalich | 312—234.3 X |
| 2,843,238 | 7/1958 | Buecker et al. | 211—10 X |
| 2,915,178 | 1/1959 | Wolke | 206—73 |
| 2,919,021 | 12/1959 | Robinson et al. | 206—73 X |
| 2,954,033 | 9/1960 | Marsden | 206—73 X |
| 3,254,930 | 7/1966 | Becker | 312—234.5 X |

CASMIR A. NUNBERG, Primary Examiner

U.S. Cl. X.R.

206—73; 312—183